(12) United States Patent
Sun et al.

(10) Patent No.: US 8,593,989 B2
(45) Date of Patent: Nov. 26, 2013

(54) METHOD AND DEVICE FOR DETERMINING CQI VALUE IN COORDINATED MULTI-POINT TRANSMISSION/RECEPTION

(75) Inventors: Yunfeng Sun, Shenzhen (CN); Junfeng Zhang, Shenzhen (CN); Jing Jiang, Shenzhen (CN); Changqing Zhu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 124 days.

(21) Appl. No.: 13/390,463

(22) PCT Filed: Jun. 9, 2010

(86) PCT No.: PCT/CN2010/073721
§ 371 (c)(1),
(2), (4) Date: Feb. 14, 2012

(87) PCT Pub. No.: WO2011/017968
PCT Pub. Date: Feb. 17, 2011

(65) Prior Publication Data
US 2012/0140694 A1     Jun. 7, 2012

(30) Foreign Application Priority Data
Aug. 14, 2009   (CN) .......................... 2009 1 0166155

(51) Int. Cl.
*H04J 1/16*     (2006.01)
(52) U.S. Cl.
USPC .......................................... 370/252; 370/328
(58) Field of Classification Search
None
See application file for complete search history.

(56) References Cited

U.S. PATENT DOCUMENTS

| | | | | |
|---|---|---|---|---|
| 2010/0271968 A1* | 10/2010 | Liu et al. | .................. | 370/252 |
| 2010/0272019 A1* | 10/2010 | Papasakellariou et al. | ... | 370/328 |
| 2010/0322176 A1* | 12/2010 | Chen et al. | .................. | 370/329 |
| 2011/0026421 A1* | 2/2011 | Luo et al. | .................. | 370/252 |

(Continued)

FOREIGN PATENT DOCUMENTS

| | | |
|---|---|---|
| CN | 101341670 | 1/2009 |
| WO | WO 2009/051456 | 4/2009 |

OTHER PUBLICATIONS

ISR for related PCT/CN2010/073721 mailed on Sep. 16, 2010; and its English translation.

(Continued)

*Primary Examiner* — Andrew Lee
(74) *Attorney, Agent, or Firm* — Ladas & Parry, LLP (57) ABSTRACT

In the invention, a method for determining a channel quality indicator (CQI) value in coordinated multi-point transmission/reception (COMP) is provided, wherein the method comprises the following steps: a receiving side feeds back an independent CQI value or normalized useful signal power of each point of all or part of the points in a COMP measurement set or reporting set to a network side; the receiving side feeds back the correlation coefficient between the channel of each point and the channel of a master serving point to the network side; and the network side determines, according to the correlation coefficient and the independent CQI value of each point or normalized useful signal power, the CQI value used for coordinated multi-point transmission/reception. In the invention, a device is also provided for determining the CQI value in COMP. The feedback overhead is low in the present invention, and a more accurate final CQI value can be obtained through function operation.

17 Claims, 4 Drawing Sheets

(56) References Cited

U.S. PATENT DOCUMENTS

| | | | |
|---|---|---|---|
| 2011/0032839 A1* | 2/2011 | Chen et al. | 370/252 |
| 2011/0103493 A1* | 5/2011 | Xia et al. | 375/259 |
| 2011/0237272 A1* | 9/2011 | Gorokhov et al. | 455/452.1 |
| 2012/0051250 A1* | 3/2012 | Sun et al. | 370/252 |
| 2012/0087332 A1* | 4/2012 | Kim et al. | 370/329 |
| 2012/0189077 A1* | 7/2012 | Seo et al. | 375/267 |

OTHER PUBLICATIONS

IPRP/WO for related PCT/CN2010/073721 issued on Feb. 14, 2012; and its English translation.

CoMP Implicit CQI Feedback discussion, SamSung, 3GPP TSG RAN WG1 Meeting ™57bis, Los Angeles, USA, Jun. 29-Jul. 3, 2009.

* cited by examiner

METHOD AND DEVICE FOR DETERMINING CQI VALUE IN COORDINATED MULTI-POINT TRANSMISSION/RECEPTION

CROSS-REFERENCE TO RELATED APPLICATIONS

This application is the U.S. National Stage of International Patent Application No. PCT/CN2010/073721 filed on Jun. 9, 2010, which claims priority to Chinese Patent Application No. 200910166155.1 filed on Aug. 14, 2009, the disclosure of which are hereby incorporated by reference in their entireties.

FIELD OF THE INVENTION

The invention relates to the field of wireless communication, and in particular to a method and a device for determining a channel quality indicator (CQI) value in coordinated multi-point transmission/reception.

BACKGROUND OF THE INVENTION

In order to improve the coverage rate of high-speed data rate service and the average throughput of the point edge and the point, the coordinated multi-point transmission/reception (COMP) technology is introduced into the LTE-A system.

In the current LTE-A, the COMP technology is mainly divided into two types as follows: (1) joint transmission technology: each point in the coordinated transmission set can obtain the data information, and the physical downlink shared channel (PDSCH) data are transmitted through multiple points or one point at the same time; and (2) coordination scheduling: only the serving point can obtain the data information to be transmitted, but the confirmation for the user scheduling and the shaped-beam is accomplished through the consultation in coordination set.

In order to support the downlink COMP transmission above, three feedback mechanisms below are considered in the current LTE-A: (1) the feedback of explicit channel state/statistical information: the channel information is same as the information observed by the receiving side and is not transmitted or processed by the receiver; (2) the feedback of implicit channel state/statistical information: different transmission or reception processing mechanisms are utilized for the feedback, e.g. the feedback of pre-coding matrix indicator (PMI), channel quality indicator (CQI) and rank indicator (RI) information; and (3) the utilization of channel mutual benefits: the sounding reference signal (SRS, used for the estimation of uplink channel at the network side) transmitted uplink by the user equipment (UE) is used for the estimation of downlink channel information.

In the COMP, the coordinated transmission set is the subset of the COMP measurement set and is determined by the network side (such as eNodeB). If the UE only feeds back the independent CQI value of each point, the eNodeB cannot calculate the practical CQI value accurately during the coordinated transmission according to each independent CQI value. If the UE also feeds back each combined CQI value besides independent CQI value of each point, the overhead is too large. If the UE only feeds back one joint CQI value, the network side cannot obtain the accurate CQI value when the coordinated transmission set is inconsistent with the COMP measurement set.

SUMMARY OF THE INVENTION

In the invention, a method and a device for determining a CQI value in coordinated multi-point transmission/reception are provided to solve at least one of the technical problems.

According to one aspect of the invention, a method for determining a CQI value in coordinated multi-point transmission/reception is provided. The method comprises the following steps of: feeding back, by a receiving side, an independent CQI value or normalized useful signal power of each point of all or part of points in a COMP measurement set or reporting set to a network side;

feeding back, by the receiving side, correlation coefficient between the channel of each point and the channel of a master serving point to the network side; and determining, by the network side, the CQI value used for coordinated multi-point transmission/reception according to the correlation coefficient and the independent CQI value of each point or normalized useful signal power.

Preferably, in the case that the independent CQI value of each point is fed back, the correlation coefficient is obtained by calculation according to a preset transmission mode and fed-back transmission weight indication information.

Preferably, pre-coding weighted processing is performed for each channel between each coordinated point for the multi-point transmission and the receiving side during a coherent transmission so as to obtain each equivalent channel; and the correlation coefficient is obtained by calculating the correlation degree between each coordinated point and the master serving point according to the each equivalent channel.

Preferably, the step of obtaining the equivalent channel further comprises the step of performing phase correction processing for the each equivalent channel.

Preferably, the correlation coefficient is calculated by directly utilizing the channel information measured from each coordinated point by the receiving side, or the correlation coefficient is set by the network side according to an empirical value during a non-coherent transmission.

Preferably, the step of feeding, by the receiving side, the independent CQI value of each point in the COMP measurement set or reporting set back to the network side comprises the step of: feeding back the independent CQI value of each point via a difference mode by regarding the master serving point as a reference.

Preferably, in the case of feeding back the normalized valuable signal power, the correlation coefficient is the average value calculated according to all the correlation coefficients and the weight value determined by the useful signal powers of all points.

Preferably, in the case of feeding back the normalized valuable power, the correlation coefficient is a vector composed of all correlation coefficients fed back by the receiving side.

Preferably, the feedback period length of the correlation coefficient is integral multiple of the CQI feedback period length.

Preferably, the channel configuration mode for the feedback of the correlation coefficient is same as the corresponding channel configuration mode for the CQI feedback; or the CQI is fed back at an uplink control channel, and the correlation coefficient is fed back at an uplink physical share channel.

Preferably, the step of feeding, by the receiving side, the correlation coefficient back to the network side comprises the steps of: feeding, by the receiving side, the correlation coefficient and CQI/pre-coding matrix indication (PMI), the correlation coefficient and rank indication (RI), or the correlation coefficient, the CQI/PMI and the RI back to the network side; or only feeding, by the receiving side, the correlation coefficient back to the network side.

According another aspect of the invention, a device for determining a CQI value in coordinated multi-point transmission/reception is provided. The device comprises: a feedback unit, adapted to feed an independent CQI value or normalized useful signal power of each point of all or part of points in a COMP measurement set or reporting set and feed correlation coefficient between the channel of each point and the channel of a master serving point; and a determining unit, adapted to determine the CQI value used for coordinated multi-point transmission/reception according to the correlation coefficient and the independent CQI of each point or the normalized useful signal power.

Preferably, the device further comprises a calculation unit, adapted to calculate the correlation coefficient according to a preset transmission mode and a pre-coding weight value or a phase correction weight value.

According to the invention, only by feeding back the CQI information of each point in the measurement set or reporting set and one piece of correlation coefficient information through the difference way, the UE can obtain the final CQI value at various combination conditions that the coordinated transmission set is less than or equal to the measurement set or the reporting set through certain function operation, thereby determining the suitable Modulation and Coding Scheme (MCS) value for the downlink transmission. The feedback overhead is low, and relatively accurate final CQI value can be obtained through the function operation.

Other characteristics and advantages of the invention will be described in the following specification, and partly become obvious from the description, or be understood by the implementation of the invention. The objects and other advantages of the invention can be realized and obtained through the structures indicated by the specification, the claims and the drawings.

BRIEF DESCRIPTION OF THE DRAWINGS

The drawings illustrated here provide a further understanding of the invention and compose a part of the application. The exemplary embodiments and the description thereof are used to explain the invention without unduly limiting the scope of the present invention, wherein.

DETAILED DESCRIPTION OF EMBODIMENTS

The embodiments of the invention are further described below with reference to the drawings in detail.

Figure 1:
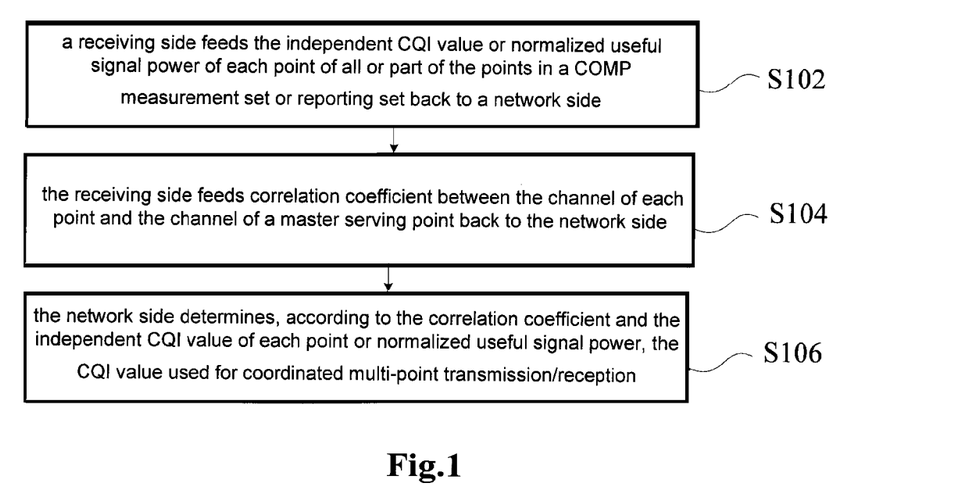
FIG. 1 shows a flowchart of a method for determining a CQI value in the coordinated multi-point transmission/reception according to an embodiment of the invention.

FIG. 1 shows a flowchart of a method for determining a CQI value in the coordinated multi-point transmission/reception according to an embodiment of the invention. Referring to FIG. 1, the method of determining the CQI value in the coordinated multi-point transmission/reception in the embodiment comprises the following steps: step S102, a receiving side feeds back an independent CQI value or normalized useful signal power of each point of all or part of the points in a COMP measurement set or reporting set to a network side; step S104, the receiving side feeds back correlation coefficient between the channel of each point and the channel of a master serving point to the network side; and step S106, the network side determines, according to the correlation coefficient and the independent CQI value of each point or normalized useful signal power, the CQI value used for coordinated multi-point transmission/reception.

Preferably, in the case that the independent CQI value of each point is fed back, the correlation coefficient is obtained by calculation according to a preset transmission mode and fed-back transmission weight indication information.

Preferably, pre-coding weighted processing is performed for each channel between each coordinated point for the multi-point transmission and the receiving side during a coherent transmission so as to obtain each equivalent channel; and the correlation coefficient is obtained by calculating the correlation degree between each coordinated point and the master serving point according to the each equivalent channel.

Preferably, the step of obtaining the equivalent channel further comprises the following step of: performing phase correction processing for the each equivalent channel.

Preferably, the correlation coefficient is calculated by directly utilizing the channel information measured from each coordinated point by the receiving side, or the correlation coefficient is set by the network side according to an empirical value during a non-coherent transmission.

Preferably, the Step S102 further comprises the following step of: feeding back the independent CQI value of each point via a difference mode by regarding the master serving point as a reference.

Preferably, the correlation coefficient is the average value calculated according to all the correlation coefficients and the weight value determined by the useful signal powers of all points. For the calculation of the average correlation coefficient, the calculation is performed according to the coefficient which is the signal power from each coordinated point to the terminal; specifically, providing that the powers from every coordinated point to the target user are respectively $\{P_{c_1}, P_{c_2}, \ldots, P_{c_m}\}$, the method for calculating the average correlation coefficient can refer to $$\delta = \frac{P_{c_1}\delta_1 + P_{c_2}\delta_2 + \ldots + P_{c_m}\delta_m}{P_{c_1} + P_{c_2} + \ldots + P_{c_m}}$$

Preferably, the correlation coefficient is a vector composed of all correlation coefficients fed back by the receiving side.

Preferably, the feedback of the correlation coefficient can be as the feedback of the long-term channel information, wherein the feedback period length of the correlation coefficient is integral multiple of the CQI feedback period length.

Preferably, the channel configuration mode for the feedback of the correlation coefficient is same as the corresponding channel configuration mode for the CQI feedback; or the CQI is fed back at an uplink control channel, and the correlation coefficient is fed back at an uplink service channel.

Preferably, the feedback relationship of the correlation coefficient and other Channel State Information (CSI) includes one or more of follows:

1) the receiving side feeds the correlation coefficient and CQI/PMI, the correlation coefficient and RI, or the correlation coefficient, the CQI/PMI and RI back to the network side; or 2) the receiving side only feeds the correlation coefficient back to the network side.

Figure 2:
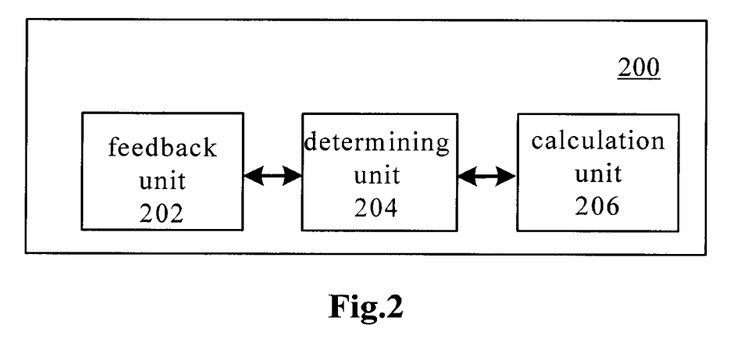
FIG. 2 shows a block diagram of a device for determining a CQI value in the coordinated multi-point transmission/reception according to an embodiment of the invention.

FIG. 2 shows a block diagram of a device for determining a CQI value in the coordinated multi-point transmission/reception according to an embodiment of the invention. Referring to FIG. 2, the device 200 for determining the CQI value in coordinated multi-point transmission/reception comprises: a feedback unit 202, adapted to feed an independent CQI value or normalized useful signal power of each point of all or part of the points in a COMP measurement set or reporting set and feeding the correlation coefficient between the channel of each point and the channel of a master serving point; and a determining unit 204, adapted to determine the CQI value in the coordinated multi-point transmission/reception according to the correlation coefficient and the independent CQI or the normalized useful signal power.

Preferably, the device for determining the CQI value further comprises a calculation unit 206, adapted to calculate the correlation coefficient according to a preset transmission mode and a pre-coding weight value or a phase correction weight value.

Figure 3:
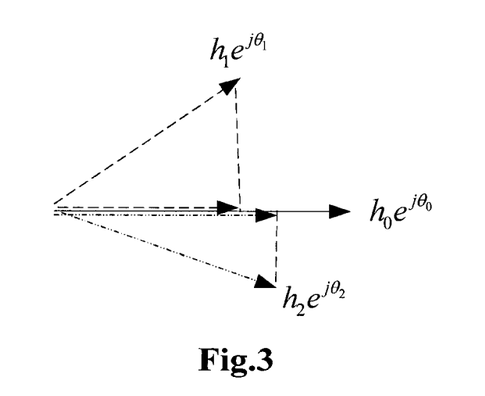
FIG. 3 shows a schematic diagram of the signal contribution from other coordinated points in the transmission set to the master serving point under the condition of different correlation coefficients according to another embodiment of the invention.
Figure 4:
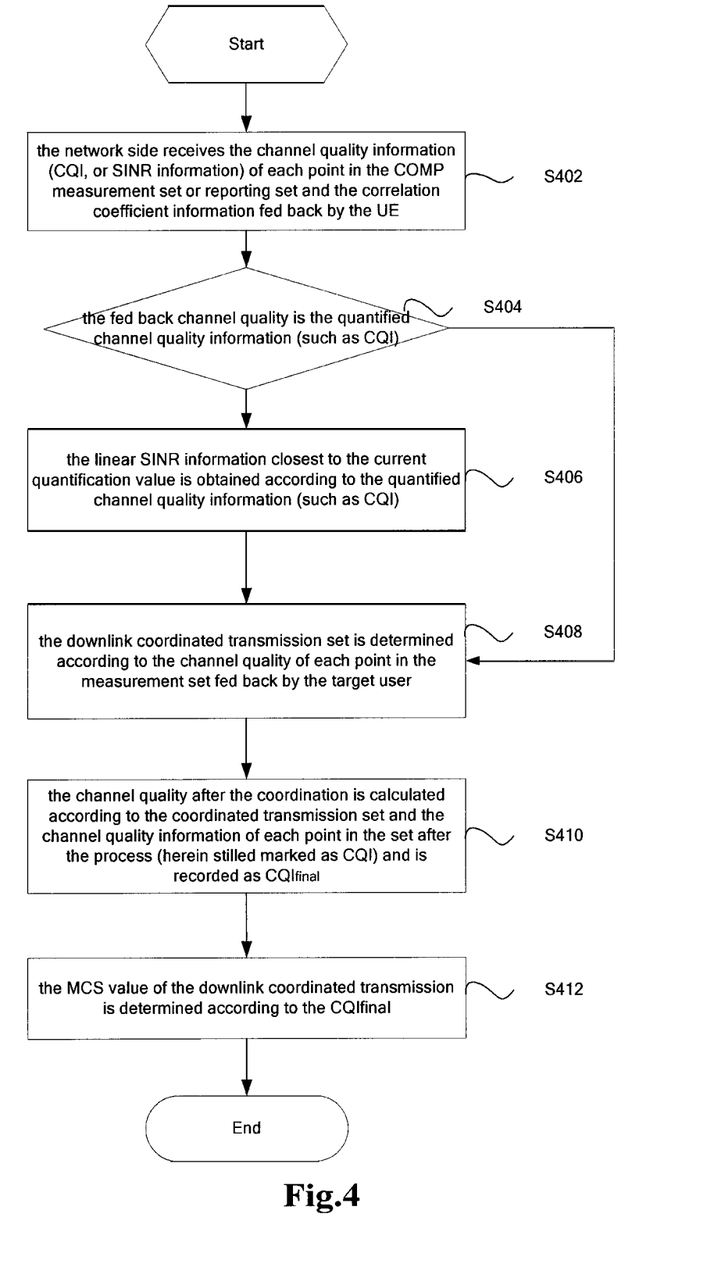
FIG. 4 shows a flowchart of the process performed by the sending side according to a first embodiment of the invention.
Figure 5:
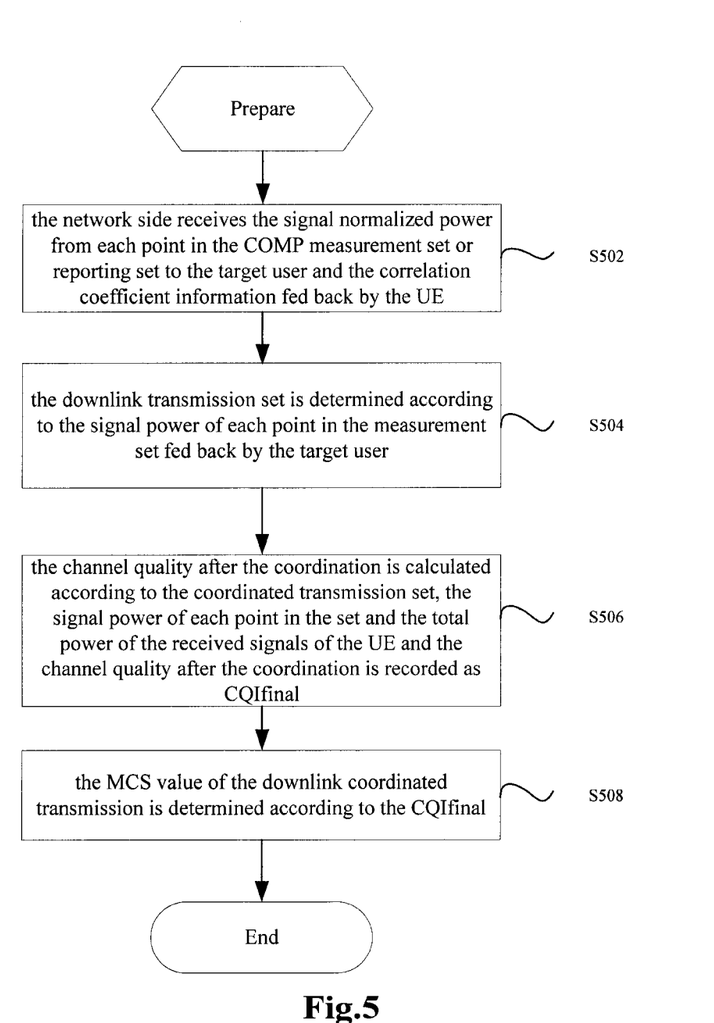
FIG. 5 shows the flowchart of the process performed by the sending side according to a second embodiment of the invention.

Other embodiments of the invention are described with the reference to FIG. 3 to FIG. 5. Before the illustration, for the convenience of description, following concepts are firstly defined:

COMP coordination set: set of points for directly and indirectly participating in the data transmission to a scheduled UE in the downlink physical shared channel.

COMP measurement set or reporting set: set of points for a scheduled UE feeding back the channel state information or the statistical information.

Coordinated transmission set: set of points transmitting data jointly in downlink physical shared channel to a scheduled UE.

It should be noted that the above points include but not limited to: eNodeB, cell, remote radio head (RRH), relay.

Embodiment 1

FIG. 4 shows a process flow for calculating the final CQI value during the coordinated multi-point transmission/reception according to the independent CQI value or signal to interference and noise power ratio (SINR) of each coordinated point and the correlation coefficient between the channel of the coordinated point and the channel of the master serving point fed back by the terminal; and the process flow comprises the following steps:

Steps S402-S406, the network side firstly receives the CQI information of each coordinated point in the reporting set or the SINR fed back by the terminal, and if the CQI value information is fed back, converts the CQI value information into the corresponding linear SINR value according to the corresponding relationship between the CQI and the SINR;

Steps S408-S410, the network side selects, according to the fed-back channel quality information, combining with the load condition of other points, several points with strongest interference as the downlink coordinated transmission set; and Step S412, the network side determines the channel quality during the coordinated transmission corresponding to the coordinated transmission set according to the finally determined channel quality information corresponding to each point in the downlink coordinated transmission set and the correlation coefficient information between the channel of the each point in the downlink coordinated transmission set and the channel of the master serving point. In the embodiment of the invention, the CQI and the SINR have preset corresponding relationship. Preferably, one section of the value range of the SINR corresponds to one CQI value.

Through the comparison of the calculation of the single-point CQI and the multi-point CQI below, an illustration is provided for how the receiving side calculates the CQI value during the final coordination according to the independent CQI value of each point and the correlation coefficient. In the illustration below, the SINR is assumed to be the linear value obtained by corresponding to the CQI:

in the case of the single point, the observed SINR corresponding to the user is shown as:

$$SINR = \frac{|h_1|^2 p_1}{\sum_{i \neq 1} |h_i|^2 p_i + \sigma^2}, \quad (1)$$

wherein $h_i$ includes the large-size decline characteristics and small-size decline characteristics of the channel; and $\sigma^2$ is the interference and noise variance excluding the measurement set or reporting set.

The terminal selects all or part of the points in the COMP measurement set (or called reporting set) for the feedback; providing that the fed-back set composes $S=\{s_1, s_2, \ldots, s_n\}$, the network side further selects all or part of the points in the fed-back set to form the coordinated transmission set $C=\{c_1, c_2, \ldots, c_m\}$ (wherein, $C \in S$) for the coordination; and the SINR after the coordination process is shown as:

$$SINR = \frac{\left|\sum_{j \in C} \sqrt{p_j} h_j\right|^2}{\sum_{i \in S, i \notin C} |h_i|^2 p_i + \sigma^2}. \quad (2)$$

UE calculates the independent PMI of each point according to the measured channel characteristics in each measurement set; and in the coherent transmission mode, the UE needs to calculate the phase correction factor. In order to reduce the feedback overhead, the phase correction factor can be directly combined into the pre-coding matrix weight value for matching so as to obtain the PMI value; providing that the phase correction vector is $\vec{w}$ the equivalent small-size decline channel is $H_i \vec{w}_i$; and providing that the pre-coding matrix is $\vec{v}_i$, the model for the channel for receiving the signal is shown as:

$$y = \sqrt{p_{c_1}} h_{c_1} H_{c_1} \vec{v}_{c_1} \vec{w}_{c_1} s + \sqrt{p_{c_2}} h_{c_2} H_{c_2} \vec{v}_{c_2} \vec{w}_{c_2} s + \quad (3)$$

$$\ldots + \sqrt{p_{c_m}} h_{c_m} H_{c_m} \vec{v}_{c_m} \vec{w}_{c_m} s + n = \left[\sqrt{p_{c_1}} h_{c_1} H_{c_1}, \right.$$

$$\left. \sqrt{p_{c_2}} h_{c_2} H_{c_2}, \ldots, \sqrt{p_{c_m}} h_{c_m} H_{c_m}\right] \begin{bmatrix} \vec{v}_{c_1} \vec{w}_{c_1} \\ \vec{v}_{c_2} \vec{w}_{c_2} \\ \vdots \\ \vec{v}_{c_m} \vec{w}_{c_m} \end{bmatrix} s + n.$$

If the phase correction among the points is firstly performed before pre-coding the data, the channel model is shown as the Equation (3), wherein $\vec{w}_i$ is the diagonal matrix including L phase adjustment factor; L is the number of the used layers; $p_{c_i}$ is the transmission signal power of the coordinated point i; and $h_{c_i}$ is the large-size decline factor. At this moment, the pre-coding matrix weight values $\vec{v}_{c_i}$ are independently obtained respectively according to the normalized values of $\sqrt{p_{c_1}}h_{c_1}H_{c_1}, \sqrt{p_{c_2}}h_{c_2}H_{c_2}, \ldots, \sqrt{p_{c_m}}h_{c_m}H_{c_m}$. The SINR of the signal in joint transmission at this moment can be shown as:

$$SINR = \frac{\left|\sum_{j \in C} \sqrt{p_j}\, h_j \vec{v}_j \vec{w}_j\right|^2}{\sum_{i \in S, i \notin C} |h_i|^2 p_i + \sigma^2}. \quad (4)$$

According to Equation (1), it can be seen that any CQI fed back by the UE includes the power information of all the signals received by the UE; through each of the $CQI_1$, $CQI_2$, ..., $CQI_n$, the valuable signal power and interference signal power from each point to the UE side can be obtained. Providing that the linear SINR values corresponding to the $CQI_1$, $CQI_2$, ..., $CQI_n$ are respectively $SINR_1$, $SINR_2$, ..., $SINR_n$, the ratio of the sum of the signal powers of different coordinated points and the total power received by the UE is shown as:

$$\frac{\sum_{i=1}^{n}\left(SINR_i \prod_{j=1, j \neq i}^{n}(SINR_j + 1)\right)}{\prod_{j=1}^{n}(SINR_j + 1)} = \sum_{i=1}^{n}\left(\frac{SINR_i}{SINR_i + 1}\right). \quad (5)$$

The above Equation (5) can be explained in this way: for the coordinated point i, the received signal is normalized as $SINR_i$, and the total signal power received by the UE is $(SINR_i + 1)$; wherein 1 is the power value of the noise and interference when the signal power is $SINR_i$. On such basis, the total power of the received signal of the UE is normalized as $$\prod_{j=1}^{n}(SINR_j + 1)$$

and recorded as $P_{sum}$, and the useful signal power of each point in the coordinated set received by the UE is $$SINR_i * \prod_{j=1, j \neq i}^{n}(SINR_j + 1)$$

which is recorded as $P_{useful\_i}$.

When all the points in the coordination set have participated into the coordination, the power of the reference signal is shown as:

$$P_{sum} - \sum_{i \in C} P_{useful\_i}. \quad (6)$$

The power of the useful signal according to Equation (4) cannot be obtained directly through the $SINR_i$ value of each point, but depends on the correlation degree of signals from different points after the phase correction and the pre-coding. If the signal can be received correlatively after the phase correction, the power of the useful signal is greater than $$\sum_{i \in C} P_{useful\_i}$$

with the reference to the $P_{sum}$. The $CQI_{final}$ after the final coordination can be calculated by establishing functional relationship between the $CQI_1, CQI_2, \ldots, CQI_n$ of each point and the correlation coefficient $\delta$, wherein $CQI_{final} = f(CQI_1, CQI_2, \ldots, CQI_k, \delta)$. For example, providing that $$Q = \sum_{i \in C}\left(\frac{SINR_i}{SINR_i + 1}\right)$$

according to said Equation (5), the SINR value corresponding to the $CQI_{final}$ can be shown as $$SINR_{final} = \frac{Q}{Q-1}.$$

If the deduction of the final $CQI_{final}$ value of the coordinated transmission is calculated according to the correlation coefficient and each independent CQI, and providing that the signals of different coordinated points after the phase correction are completely correlated, that is, the signals are completely in the same phase; and with reference to the Equation (4), the power for the signal part during the transmission is as follows:

$$|(h_{c_1}e^{j\theta} + h_{c_2}e^{j\theta} + \ldots + h_{c_m}e^{j\theta})|^2 = (|h_{c_1} + h_{c_2} + \ldots + h_{c_n}|^2) =$$

$$\sum_{i \in C} P_{useful\_i} + \sum_{i \in C}\left(\sqrt{P_{useful\_i}} * \sum_{i \in C, j \neq i} \sqrt{P_{useful\_i}}\right)$$

When the signals from different points to the UE cannot be completely correlated after the phase correction, certain correlation coefficient is existed between the signals from different points and the signals of the serving point. As shown in FIG. 3, only a part of signal powers of the signals from the coordinated points can be combined with the signals of the serving point; and the correlation degree $\delta_i$ between the signals of the coordinated points and the signals of the master serving point is determined.

Providing that after the phase correction the correlation degrees between the signals of different coordinated points and the signals of the master serving point are equivalent, the power of the received signal is shown as follows:

$$|(h_{c_1}e^{j\theta} + \delta_{c_2}h_{c_2}e^{j\theta} + \ldots + \delta_{c_m}h_{c_m}e^{j\theta})|^2 =$$

$$(|h_{c_1} + \delta_{c_2}h_{c_2} + \ldots + \delta_{c_m}h_{c_m}|^2) =$$

$$\left(P_{useful\_c1} \sum_{i=c_2}^{c_m} \delta_i^2 P_{useful\_i}\right) + 2\sqrt{P_{useful\_c1}} \sum_{i=c_2}^{c_m} \delta_j \sqrt{P_{useful\_j}} +$$

$$\sum_{i=c_1}^{c_m}\left(\delta_i \sqrt{P_{useful\_i}} * \sum_{j=c_1, j \neq c_i}^{c_m} \delta_j \sqrt{P_{useful\_j}}\right)$$

Therefore, after the coordination by the coordinated points, the signal to interference and noise power ratio of the UE can be shown as:

$$SINR_{final} = \frac{\left|\sqrt{P_{useful\_c1}} \sum_{i \in C, i \neq c_1} \delta_i \sqrt{P_{useful\_i}}\right|^2}{\prod_{j=1}^{n}(SINR_j + 1) - \sum_{i=c_1}^{c_m} P_{useful\_i}} = \quad (7)$$

$$\frac{\left(P_{useful\_c1} \sum_{i=c_2}^{c_m} \delta_i^2 P_{useful\_i}\right) + 2\sqrt{P_{useful\_c1}} \sum_{i=c_2}^{c_m} \delta_j \sqrt{P_{useful\_j}} +}{\sum_{i=c_1}^{c_m}\left(\delta_i \sqrt{P_{useful\_i}} * \sum_{j=c, j \neq c_i}^{c_m} \delta_j \sqrt{P_{useful\_j}}\right)}{\prod_{j=1}^{n}(SINR_j + 1) - \sum_{i=c_1}^{c_m} P_{useful\_i}}$$

Actually, Equation (7) can be simplified as $$Q' = \sum_{i \in C}\left(\frac{\delta_i^2 \cdot SINR_i}{SINR_i + 1}\right);$$

and the $SINR_{final}$ corresponding to the $CQI_{final}$ is as follows:

$$SINR_{final} = \frac{Q'}{1 - Q'}.$$

The $CQI_{final}$ for determining modulation and coding scheme (MCS) is obtained according to the $SINR_{final}$, or the MCS value is determined directly according to the $SINR_{final}$.

In above Equation, n is the number of the points participating in the actual coordination. Might as well, providing that the correlation degrees between the signals of the coordinated points and the signals of the master serving point are equivalent after the phase correction, only an average correlation coefficient δ needs to be fed back in this case.

Embodiment 2

FIG. 5 shows a process flow for calculating the final CQI value during the coordinated multi-point transmission/reception according to the independent useful signal normalized power of each coordinated point and the correlation coefficient between the channel of the coordinated point and the channel of the master serving point fed back by the terminal, wherein the process flow comprises the following steps:

Step S502, the network side firstly receives the normalized useful signal power information of each coordinated point in the reporting set fed back by the terminal (preferably, also including the correlation coefficient information), wherein the normalization for the useful signals from every point in the measurement set to the terminal user is to normalize by using the sum of the powers of all the signals received by the terminal.

Step S504, the network side selects, according to the fed-back normalized useful signal power information, combining with the load condition of other points, several points with strongest interference as the downlink coordinated transmission set; and Steps S506-S508, the network side determines the channel quality during the coordinated transmission corresponding to the coordination transmission set according to the finally determined normalized useful signal power information corresponding to each point in the downlink coordinated transmission set and the correlation coefficient between the channel of each point in the downlink coordinated transmission set and the channel of the maser serving point.

When the UE feeds back the useful signal power value, which is normalized using the total received signal power, of all or part of the points in the COMP measurement or reporting set and the correlation coefficient δ between the channel of each point in the COMP measurement set or reporting set and the channel of the master serving point, the network side determines the final CQI in the following process.

Similar to the Embodiment 1, the terminal selects all or part of the points in the COMP measurement set (or called reporting set) for the feedback; providing that the fed-back set composes $S = \{s_1, s_2, \ldots, s_n\}$, the network side further selects all or part of the points in the fed-back set to form the coordinated transmission set $C = \{c_1, c_2, \ldots, c_m\}$; and providing that the signal power of each point in the set $S = \{s_1, s_2, \ldots, s_n\}$ fed back by the terminal is $[P_1 \; P_2 \ldots P_n]$, wherein the n is the number of the points in the S.

When the UE feeds back the power information of each point, the power of each point signal can be normalized by the total received power. That is to say, the $$\sum_{i \in S} P_i + \sigma^2$$

is normalized as 1; simultaneously, the signal power of each point is normalized by the $$\sum_{i \in S} P_i + \sigma^2;$$

and the normalized signal power information and the correlation coefficient information are fed back to the network side.

Simultaneously, providing that the point set for the coordinated transmission determined by the network side is C, wherein C∈S, the method for calculating the final SINR according to the feedback information is as follows:

$$SINR = \frac{\left|\sqrt{p_{c_1}} + \sum_{j \in c, j \neq c_1} \delta_j \sqrt{p_j}\right|^2}{1 - \sum_{i \in C} P_i}$$

The network side obtains the final CQI information according to the estimated SINR. When the feedback load is considered or the correlation degrees between the signal of each coordinated point and the signal of the master serving point are considered to be equivalent, only an average correlation coefficient can be fed back.

In the embodiment of the invention, the CQI and the SINR have a preset corresponding relationship; and preferably, one section of the value range of the SINR corresponds to one CQI value.

In the invention, the value range of the correlation coefficient is as follows: δ is greater than or equal to −1 but less than or equal to 1; when the correlation coefficient δ is less than 0, it indicates that the signal has no help for the received signal of the master serving point, but instead cancels out the signal of the master serving point.

Above description is only to illustrate the preferred embodiments of the invention and not to limit the invention. For those skilled in the art, the invention may have various modifications and changes. Any modifications, equivalent replacements, improvements and the like within the spirit and principle of the invention shall fall within the scope of protection of the invention.

What is claimed is:

1. A method for determining a channel quality indicator (CQI) value in coordinated multi-point transmission/reception (COMP), comprising the steps of:
   feeding back, by a receiving side, an independent CQI value or normalized useful signal power of each point of all or part of points in a COMP measurement set or reporting set to a network side;
   feeding back, by the receiving side, correlation coefficient between the channel of each point and the channel of a master serving point to the network side; and
   determining, by the network side, the CQI value used for coordinated multi-point transmission/reception according to the correlation coefficient and the independent CQI value of each point or normalized useful signal power.

2. The method according to claim 1, wherein in the case that the independent CQI value of each point is fed back, the correlation coefficient is obtained by calculation according to a preset transmission mode and fed-back transmission weight indication information.

3. The method according to claim 2, wherein pre-coding weighted processing is performed for each channel between each coordinated point for the multi-point transmission and the receiving side during a coherent transmission so as to obtain each equivalent channel; and the correlation coefficient is obtained by calculating the correlation degree between each coordinated point and the master serving point each equivalent channel.

4. The method according to claim 3, wherein the step of obtaining the equivalent channel further comprises the step of performing phase correction processing for the each equivalent channel.

5. The method according to claim 2, wherein the correlation coefficient is calculated by directly utilizing the channel information measured from each coordinated point by the receiving side, or the correlation coefficient is set by the network side according to an empirical value during a non-coherent transmission.

6. The method according to claim 1, wherein the step of feeding, by the receiving side, the independent CQI value of each point in the COMP measurement set or reporting set back to the network side comprises the step of:
   feeding back the independent CQI value of each point via a difference mode by regarding the master serving point as a reference.

7. The method according to claim 1, wherein the correlation coefficient is the average value calculated according to all the correlation coefficients and the weight value determined by the useful signal powers of all points.

8. The method according to claim 1, wherein the correlation coefficient is a vector composed of all correlation coefficients fed back by the receiving side.

9. The method according to claim 1, wherein the feedback period length of the correlation coefficient is integral multiple of the CQI feedback period length.

10. The method according to claim 1, wherein the channel configuration mode for the feedback of the correlation coefficient is same as the corresponding channel configuration mode for the CQI feedback; or the CQI is fed back at an uplink control channel, and the correlation coefficient is fed back at an uplink physical share channel.

11. The method according to claim 1, wherein the step of feeding, by the receiving side, the correlation coefficient back to the network side comprises the steps of:
   feeding, by the receiving side, the correlation coefficient and CQI/pre-coding matrix indication (PMI), the correlation coefficient and rank indication (RI), or the correlation coefficient, the CQI/PMI and the RI back to the network side; or
   only feeding, by the receiving side, the correlation coefficient back to the network side.

12. A device for determining the Channel Quality Indicator (CQI) value in Coordinated Multi-Point Transmission/Reception (COMP), comprising:
   a feedback unit, adapted to feed an independent CQI value or normalized useful signal power of each point of all or part of points in a COMP measurement set or reporting set and feed correlation coefficient between the channel of each point and the channel of a master serving point; and
   a determining unit, adapted to determine the CQI value used for coordinated multi-point transmission/reception according to the correlation coefficient and the independent CQI of each point or the normalized useful signal power.

13. The device according to claim 12, further comprising a calculation unit, adapted to calculate the correlation coefficient according to a preset transmission mode and a pre-coding weight value or a phase correction weight value.

14. The method according to claim 2, wherein the step of feeding, by the receiving side, the independent CQI value of each point in the COMP measurement set or reporting set back to the network side comprises the step of:
   feeding back the independent CQI value of each point via a difference mode by regarding the master serving point as a reference.

15. The method according to claim 3, wherein the step of feeding, by the receiving side, the independent CQI value of each point in the COMP measurement set or reporting set back to the network side comprises the step of:
   feeding back the independent CQI value of each point via a difference mode by regarding the master serving point as a reference.

16. The method according to claim 4, wherein the step of feeding, by the receiving side, the independent CQI value of each point in the COMP measurement set or reporting set back to the network side comprises the step of:
   feeding back the independent CQI value of each point via a difference mode by regarding the master serving point as a reference.

17. The method according to claim 5, wherein the step of feeding, by the receiving side, the independent CQI value of each point in the COMP measurement set or reporting set back to the network side comprises the step of:
   feeding back the independent CQI value of each point via a difference mode by regarding the master serving point as a reference.

* * * * *